United States Patent
Naiki et al.

(10) Patent No.: US 6,898,330 B2
(45) Date of Patent: May 24, 2005

(54) IMAGE PROCESSOR

(75) Inventors: Takashi Naiki, Kyoto (JP); Hiroshi Nishide, Kyoto (JP); Makoto Miyamura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 580 days.

(21) Appl. No.: 09/943,218

(22) Filed: Aug. 29, 2001

(65) Prior Publication Data

US 2002/0039453 A1 Apr. 4, 2002

(30) Foreign Application Priority Data

Sep. 1, 2000 (JP) ........................................ 2000-265631

(51) Int. Cl.⁷ ................................................ G06K 9/40
(52) U.S. Cl. ...................... 382/274; 382/235; 382/243; 382/275; 358/3.26; 358/3.27; 358/520
(58) Field of Search ................................ 382/235, 243, 382/252, 260, 263, 274, 275; 358/3.26, 3.27, 520, 452, 463

(56) References Cited

U.S. PATENT DOCUMENTS

| | | | | |
|---|---|---|---|---|
| 4,281,295 A | * | 7/1981 | Nishimura et al. | 333/14 |
| 4,974,007 A | * | 11/1990 | Yoshida | 396/121 |
| 5,155,581 A | * | 10/1992 | Tanaka et al. | 348/225.1 |
| 5,214,294 A | * | 5/1993 | Toyofuku | 250/559.05 |
| 5,283,635 A | * | 2/1994 | Suzuki et al. | 358/516 |
| 5,291,044 A | * | 3/1994 | Gaboury et al. | 257/230 |
| 6,404,487 B1 | * | 6/2002 | Sato et al. | 356/215 |

* cited by examiner

*Primary Examiner*—Kanjibhai Patel
*Assistant Examiner*—Yosef Kassa
(74) *Attorney, Agent, or Firm*—Hogan & Hartson LLP (57) ABSTRACT

An image processor for forming an easy-to-see image by broadening the significant band of image data received from a logarithmic (LOG) image sensor to enhance the contrast of the image. The LOG image sensor generates an output in response to the light, with the output voltage being a logarithm of the intensity of the light received. The image processor extracts only those pixel data in the significant band out the image data received from the LOG image sensor in accordance with the distribution of the voltage of the signals. In order to form an easy-to-see image, the processor expands the voltage band, assuming that the output voltage has a linear dependence on the intensity of light received by the LOG image sensor. The resultant image has an wider band in voltage, which enhances the contrast, and hence the visibility, of the image.

12 Claims, 8 Drawing Sheets

IMAGE PROCESSOR

FIELD OF THE INVENTION

The invention relates to an image processor for processing image signals output from an image sensor such as CCD image sensor.

BACKGROUND OF THE INVENTION

Some image sensors, typically CCD image sensors utilizing CCD solid image pickup elements, perform a logarithmic conversion on the brightness signals they receive to expand their dynamic ranges.

This type of image sensors, called logarithmic sensors, (hereinafter referred to as LOG image sensors) have very wide dynamic ranges capable of covering dark night sceneries and bright snowy sceneries as well, as depicted by a brightness-output characteristic curve (solid line) shown in FIG. 1. Comparing the brightness-output characteristic of such LOG image sensor with that of a conventional CCD sensor shown by a dotted curve, it is seen that the former sensor has a much wider dynamic range than the latter.

Figure 1:
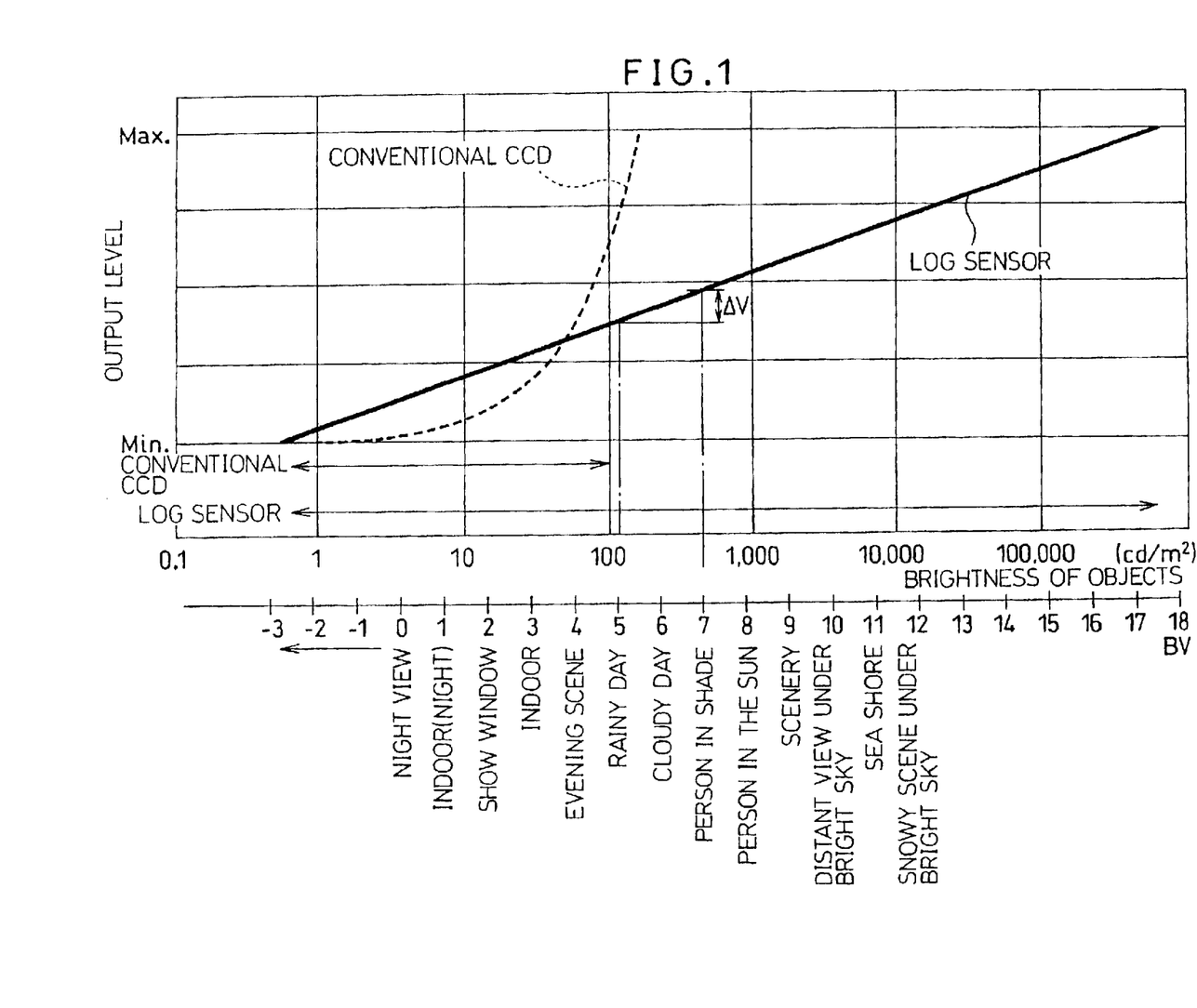
FIG. 1 is a graph showing a brightness-output level characteristic of a LOG image sensor.

However, since the output voltage of a LOG image sensor represents a logarithmically converted brightness of an object, image data output therefrom are distributed within a narrow voltage band, as indicated by $\Delta V$ in FIG. 1, so that the image has a poor contrast when displayed as it is.

However, inversion of the logarithmically converted image data back to their original linear image data requires a complex data processing.

SUMMARY OF THE INVENTION

It is therefore an object of the invention to provide an image processor which may expand or convert compressed image data output from a sensor that generates compressed image data (hereinafter referred to as compressive image sensor) such as a LOG sensor, thereby forming an easy-to-see image having an enhanced contrast.

It is another object of the invention to provide a simple image processor capable of processing logarithmic image signals.

An image processor of the invention comprises:
voltage band determination means for determining a significant voltage range or band of compressed image data belonging to a specified area of a picture (the area hereinafter referred to as assessment area), in accordance with the range of voltage of the image data generated by a compressive image sensor such as a LOG sensor; and
image conversion means for converting the voltage band assuming that the voltage of a pixel signal depends linearly on the intensity of light over the voltage band.

The image processor may extract a significant voltage band to extract only significant pixel data out of the voltage signals from the compressive image sensor in accordance with the range of voltage of the signals, and discards the rest of the voltage signals in converting or expanding the significant band, assuming that the voltage of a pixel signal depends linearly on the intensity of light over the significant band, thereby forming an easy-to-see image in a simple manner. It is noted that the image processor of the invention can simultaneously carry out white balancing processing for each of different color pixels (RGB pixels of a color image sensor for example), and hence may have a simplified structure.

Image conversion of the band can be carried out by the image conversion means in a simple manner by: subtraction means e.g. a subtractor for subtracting the lower limit of the voltage band from the voltage band so as to match the lower limit of the band with a prescribed post-conversion minimum Lmin; and multiplication means e.g. a multiplier for converting the subtracted band so as to match the converted upper limit of the subtracted band with a prescribed post-conversion maximum Lmax. In the invention, the post-conversion maximum Lmax and the post-conversion minimum Lmin can be arbitrarily chosen as needed.

The conversion can be carried out alternatively by means of
multiplication means for first converting the significant voltage band by multiplication so as to match the converted upper limit of the voltage band with the prescribed post-conversion maximum Lmax; and
operational means for further converting the first converted band so as to match the lower limit of the first converted band with the prescribed post-conversion minimum Lmin.

In another aspect of the invention, there is provided an image processor, comprising:
first conversion means for obtaining first conversion data D' for the entire pixel data D lying within a significant voltage band Dmin–Dmax by
(i) constructing a ratio R of the sum of the assessment pixel data summed on the assumption that all the assessment pixel data have maximum possible values, to the sum of the assessment pixel data,
(ii) multiplying each of the pixel data D by the ratio R and a first predetermined coefficient A, and
(iii) replacing by a prescribed post-conversion maximum Lmax those pixel data that exceed the post-conversion maximum Lmax upon multiplication of the ratio R and the coefficient A;
second conversion means for obtaining second conversion data D" by
(iv) subtracting each of the pixel data D' from Lmax,
(v) multiplying each of the subtracted data of (iv) by a second predetermined coefficient B,
(vi) replacing by the post-conversion maximum Lmax those pixel data that exceed the post-conversion maximum Lmax upon multiplication of the coefficient B, and
(vii) subtracting again from the post-conversion maximum Lmax each of the data that results from the foregoing steps (iv)–(vi).

In this arrangement, since the entire data D are subjected to the first and the second conversions in such a way that the data D are converted to D' in the first conversion by multiplication of a first coefficient A and a ratio R, where R is the ratio of the sum $\Sigma W$ of all the pixel data in the assessment area summed on the assumption that all of the pixel data have maximum possible values (i.e. they are all white) to the sum $\Sigma D$ of all the processing pixel data, and that the converted pixel data D' are further converted to D" in the second conversion by multiplication of a second coefficient B and a prescribed post-conversion maximum Lmax, a frame memory for example for storing the pixel data D is not necessary for the image processing. This implies that the image processing can be carried out through sequential conversions of the data by simple multiplication and subtractions.

In this image processor, the first conversion means may perform feedback processing to decrease the first coefficient A by a predetermined magnitude if the number of pixel data of the image data in the assessment area replaced by the post-conversion maximum Lmax exceeds a predetermined number N1, but increment the first coefficient A by a predetermined magnitude if the number of the replaced pixel data is less than a predetermined number N2. Further, the second conversion means may perform further feedback processing to decrease the second coefficient B by a predetermined magnitude if the number of pixel data in the assessment area replaced by the post-conversion maximum Lmax exceeds a predetermined number N3, but increment the second coefficient B by a predetermined magnitude if the number of the pixel data replaced is less than a predetermined number N4.

Accordingly, the first and the second coefficients A and B, respectively, are decreased or increased in accordance with the number of pixel data belonging to the assessment area and replaced by the post-conversion maximum Lmax, so that the upper limit of the significant image data D is automatically adjusted in the conversions to match with the post-conversion maximum Lmax.

In a further aspect of the invention, there is provided an image processor, comprising:

first conversion means for converting all the pixel data D lying in a voltage band in a range Dmin–Dmax to obtain first converted pixel data D' by
(i) multiplying the pixel data D by a third coefficient C1 having a predetermined initial value,
(ii) replacing those converted pixel data that exceed a prescribed post-conversion maximum Lmax by the post-conversion maximum Lmax; and second conversion means for obtaining second converted pixel data D" by
(iii) subtracting each of the first converted pixel data D' from the post-conversion maximum Lmax,
(iv) multiplying the result of the subtraction in (iii) by a fourth multiplication coefficient C2,
(v) replacing by the post-conversion maximum Lmax those pixel data that exceed Lmax upon multiplication of C2 in (iv), and
(vi) again subtracting from Lmax each of the resultant pixel data obtained in steps (iii)–(v).

With this image processor, since a significant voltage band Dmin–Dmax of pixel data D can be determined using a third and a fourth coefficient C1 and C2, respectively, no operational means such as a frame memory for storing the pixel data D in determining the voltage band Dmin–Dmax based on statistical techniques, or no means for summing pixel data in the assessment area is needed. Accordingly, circuitries for the image processing may be simplified.

It is noted that the image processing can be carried out through sequential conversions of the data by simple multiplication and subtractions as described above.

The first conversion means may have a feedback loop to decrease the third coefficient C1 by a predetermined magnitude when the number of pixel data that have been replaced by the post-conversion maximum Lmax in the first conversion is greater than a predetermined number N1, but increment the third coefficient C1 by a predetermined magnitude when the number of replaced pixels is less than a predetermined number N2. The second conversion means may have a feedback loop to decrease the fourth coefficient C2 by a predetermined magnitude when the number of pixel data replaced by Lmax is greater than a predetermined number N3, but increment the fourth coefficient C2 by a predetermined magnitude when the number of replaced pixel data is less than a predetermined number N4.

Accordingly, the third coefficient C1 is decreased or increased in the first conversion in accordance with the number of pixel data replaced by the post-conversion maximum Lmax, and the fourth coefficient C2 is decreased or increased in the second conversion in accordance with the number of pixel data replaced by the post-conversion maximum Lmax, so that the upper and the lower limits of the significant image data D is automatically adjusted in the conversions to match with the post-conversion maximum and minimum.

The image processor of the invention may provide alternative outputs in which the post-conversion maximum Lmax is replaced by a modified post-conversion maximum Lmax' defined by Lmax'=Lmax–Lmin in the first and the second conversion means when the post-conversion minimum Lmin is not zero (i.e. positive or negative), and the second converted pixel data D" are added with the post-conversion minimum Lmin in the second conversion means.

Accordingly, the post-conversion minimum Lmin can assume an arbitrary value other than zero. It would be appreciated that this feature of the invention enables simplification of image processing means, since the difference between the post-conversion maximum Lmax and the post-conversion minimum Lmin can be used as the modified post-conversion maximum Lmax' in the first conversion, and since the second conversion is completed by adding the post-conversion minimum Lmin to the second converted data D".

The image processor of the invention may be adapted to subtract the post-conversion minimum Lmin from all of the pixel data D prior to the first conversion. In this arrangement, any of the pixel data D can be prevented from exceeding the post-conversion maximum Lmax, since all the pixel data D are decreased by the same magnitude as the post-conversion minimum Lmin.

DETAILED DESCRIPTION OF THE PREFERRED EMBODIMENTS

The invention will now be described in detail by way of example with reference to the accompanying drawings. The invention performs an image conversion on pixel data of an image in a voltage band extracted from the output of a logarithmic image sensor in accordance with the range of voltage of the pixel data. The conversion is performed only on the pixel data in the band based on an assumption that the output voltage, indicative of the intensity of light received by the image sensor, depends linearly on the intensity.

Figure 2A:
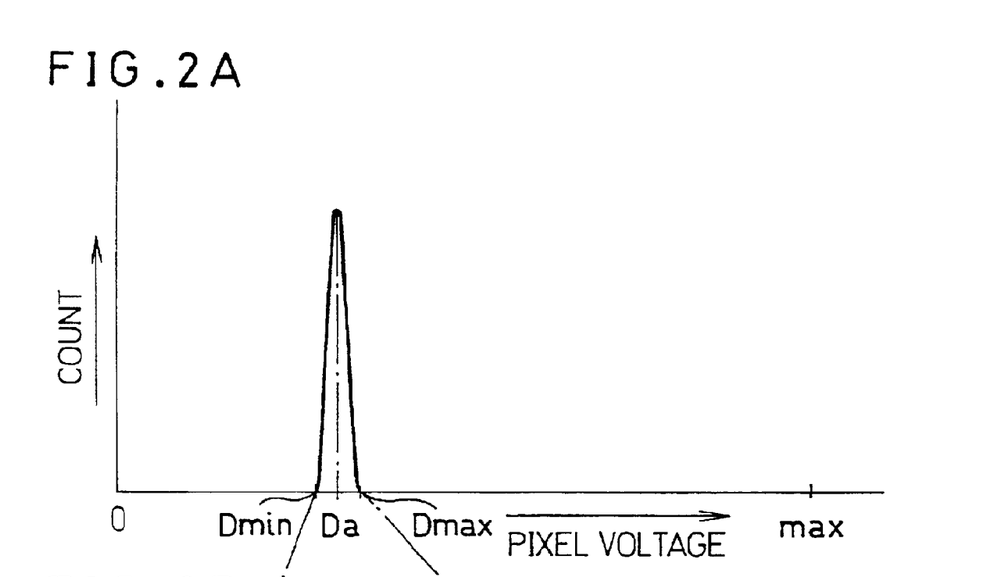
FIG. 2 shows an inventive concept of image conversion to perform expansion of a voltage band of a LOG image sensor.

FIG. 2 illustrates the concept of the invention. A logarithmic image sensor converts a light signal it receives to a voltage which is proportional to the logarithm of the intensity of the light (the sensor hereinafter referred to as LOG image sensor). Thus, as seen in FIG. 2(a), the pixel data forming a picture provided by such logarithmic image sensor are distributed in a narrow range or band of voltage, Dmin–Dmax, centered at a point Da say.

Figure 2B:
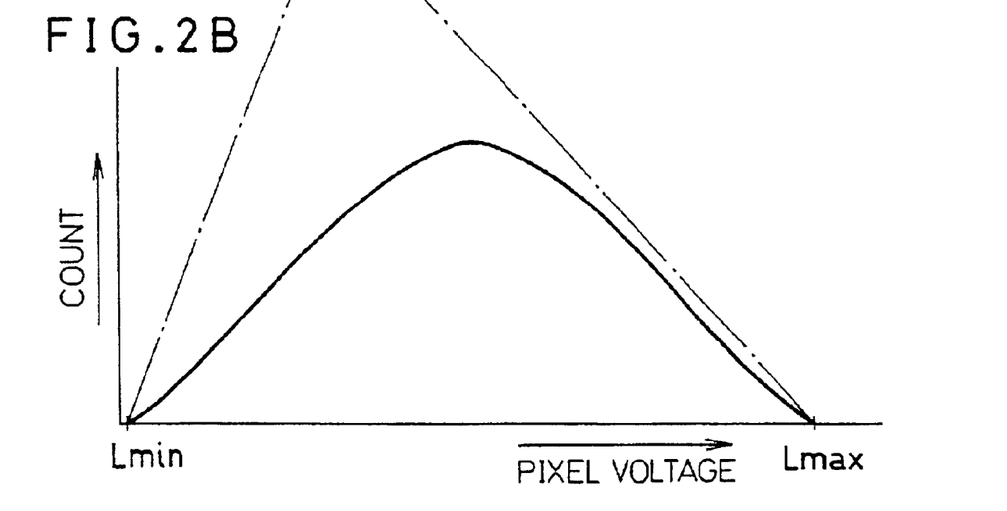

All the significant pixel data are compressed in this narrow voltage band, Dmin–Dmax. Thus, if this voltage band is expanded over a wider range between a prescribed maximum pixel voltage Lmax and a prescribed minimum pixel voltage Lmin as shown in FIG. 2(b), the contrast of the image is enhanced, making the picture easy to see. The post-conversion maximum Lmax and the post-conversion minimum Lmin can be arbitrarily chosen as needed. For example, the post-conversion maximum Lmax is a maximum possible voltage that can be obtained by the conversion, and the post-conversion minimum is zero.

In view of the fact that the pixel data result from a logarithmic conversion by the logarithmic image sensor, one might think that an adequate operation to restore the contrast is an inverse-logarithmic conversion of the pixel data. However, since the pixel data is concentrated in a comparatively narrow band of voltage, the invention assumes that the voltage of the image sensor depends on the intensity of light linearly over the voltage band to simplify the image processing. This linear approximation induces minor errors in the conversion, which visually affects the image only negligibly, so that the errors do not cause any serious problem.

Figure 3:
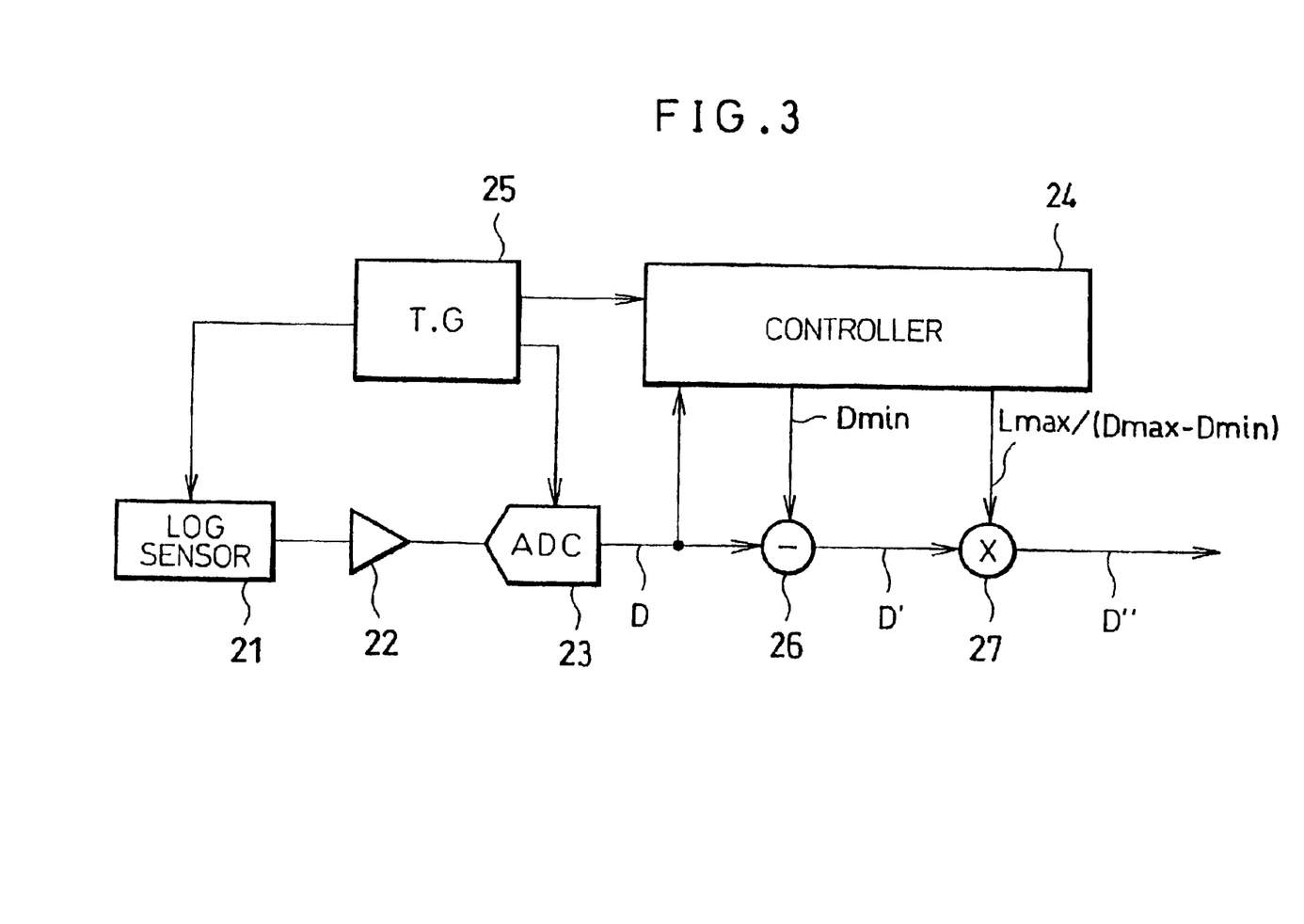
FIG. 3 is a block diagram representation of a first embodiment of an image processor according to the invention.

FIG. 3 shows a first embodiment of an image processor according to the invention.

As shown in FIG. 3, image data generated by a LOG image sensor 21 are amplified by an amplifier 22 and converted to a digital pixel data D each having predetermined bits (8 bits for example) by an analog/digital converter (ADC) 23. The pixel data D are supplied to a controller 24. The controller 24 controls the image processor in accordance with the invention. A timing signal generator 25 provides different timing signals to the LOG image sensor 21, the ADC 23, and the controller 24.

The controller 24 determines, from the input pixel data D, the upper and the lower voltage limits Dmax and Dmin, respectively, of the assessment pixel data within the assessment area (which can be an entire picture or a portion thereof). The pixel data outside the upper and the lower voltage limits Dmax and Dmin are discarded as noise. The upper and the lower voltage limits Dmax and Dmin, respectively, may be determined from the frame immediately preceding the currently processing image data. The frame may be retrieved from a frame memory for example. Alternatively, any preferred portion or portions of a frame may be chosen as the assessment area.

The image data supplied from the LOG image sensor 21 normally contains several tens of similar frames (typically 30 picture frames) per second, so that only the latest one of the preceding frames can be used as the basis for the assessment area. Alternatively, the current pixel data D may be supplied to a subtractor 26 with a sufficient delay necessary for the determination of the upper and the lower voltage limits Dmax and Dmin, respectively. In this case, the upper and the lower voltage limits Dmax and Dmin may be determined from the image data belonging to the currently processing data D, not from the preceding one. It would be understood that this determination can be used in other embodiments of the invention described below.

The lower voltage limit Dmin thus obtained by the controller 24 is subtracted from each pixel data D in the subtractor 26 so that the lower voltage limit Dmin matches with a prescribed post-conversion minimum Lmin (e.g. 0 Volt). The resultant pixel data D' constitute a first converted pixel data D'.

The second converted pixel data D" are obtained by multiplying in a multiplier 27 the first converted pixel data D' by a multiplication factor Lmax/(Dmax–Dmin) given by the controller 24 so that the upper limit of the first converted pixel data D' matches with the prescribed post-conversion maximum voltage Lmax. A set of pixel data thus obtained, referred to as the second converted pixel data D", are output from the image processor as the image data to be displayed.

In this manner, image data initially compressed in a rather narrow voltage band Dmin–Dmax as shown in FIG. 2(a) are expanded or converted to image data having an expanded voltage band Lmin–Lmax, through comparatively simple data processing as described above.

It is noted that a white balancing data processing may be simultaneously performed for each of different color images (RGB images of a color image sensor for example) using the above described expansion of the voltage band, so that the image processor can be structurally simplified. This feature of the invention is not limited to the above embodiment but equally applicable to other embodiments.

Figure 4:
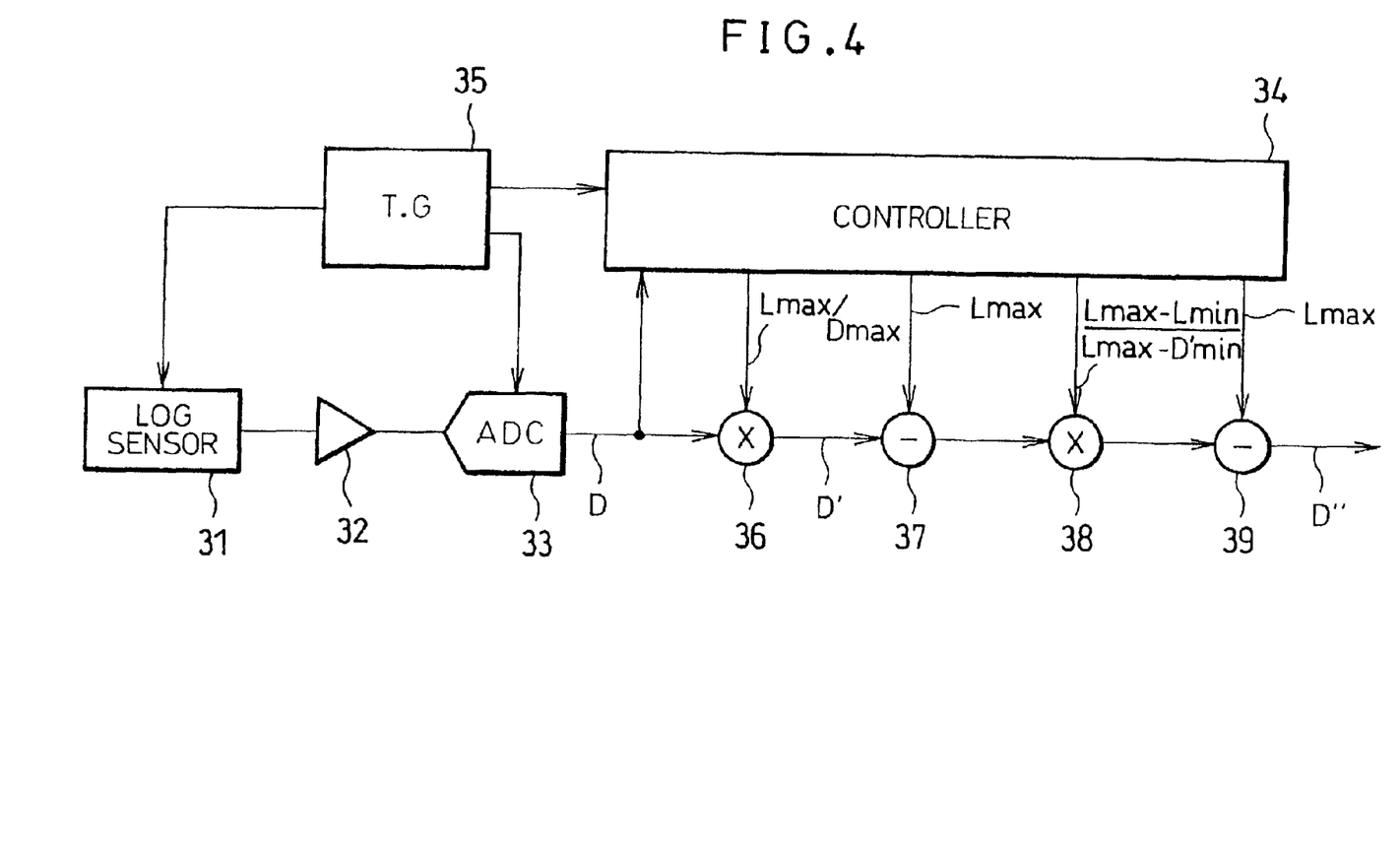
FIG. 4 is a block diagram representation of a second embodiment of an image processor according to the invention.

FIG. 4 shows a second embodiment of an image processor of the invention.

In FIG. 4, the image data provided by the LOG image sensor 31 is amplified by an amplifier 32 and converted by an ADC 33 to digital data having a predetermined number of bits (8 bits for example). The pixel data D is supplied to a controller 34 controlling the data processing in the second embodiment of the invention. A timing clock 35 provides different timing signals to the LOG image sensor 31, the ADC 33, and the controller 34.

As in the first embodiment, the controller 34 determines, from the input pixel data D, the upper and the lower voltage limits Dmax and Dmin, respectively, of the assessment pixel data within the assessment area. The pixel data outside the upper and the lower voltage limits Dmax and Dmin are regarded as noise.

The pixel data D are multiplied in the multiplier 36 by the ratio, Lmax/Dmax, of a prescribed post-conversion maximum Lmax (255 for 8-bit data for example) to the upper voltage limit Dmax of the voltage band, so that the upper voltage limit Dmax matches with the post-conversion maximum Lmax. The pixel data thus converted constitute the first converted pixel data D'.

The controller 34 then provides a ratio (Lmax–Lmin)/(Lmax–D'min).

Next, the post-conversion maximum Lmax of the converted pixel data minus the value of each converted pixel data D' is calculated in the subtractor 37. The difference is then multiplied by the ratio (Lmax–Lmin)/(Lmax–D'min) in the multiplier 38. The second converted pixel data D" are obtained by subtracting the resultant difference from the post-conversion maximum Lmax. The second converted pixel data D" are output from the image processor of the invention as the image data to be displayed.

The second converted pixel data D" may be expressed in terms of the first converted pixel data D' as follows.

$$D''=L\max-(L\max-D')\times(L\max-L\min)/(L\max-D'\min)$$

In this conversion, subtractions performed by the subtractors 37 and 39 amounts to the inversion of all the bits of subtrahends if the post-conversion maximum Lmax has the maximum possible value (255 in the case of 8-bit data).

Thus, in accordance with the embodiment, pixel data having a rather narrow voltage band in the range of Dmin–Dmax as shown in FIG. 2(a) are converted to a much wider band over the range Lmin–Lmax through simple data processing.

Figure 5:
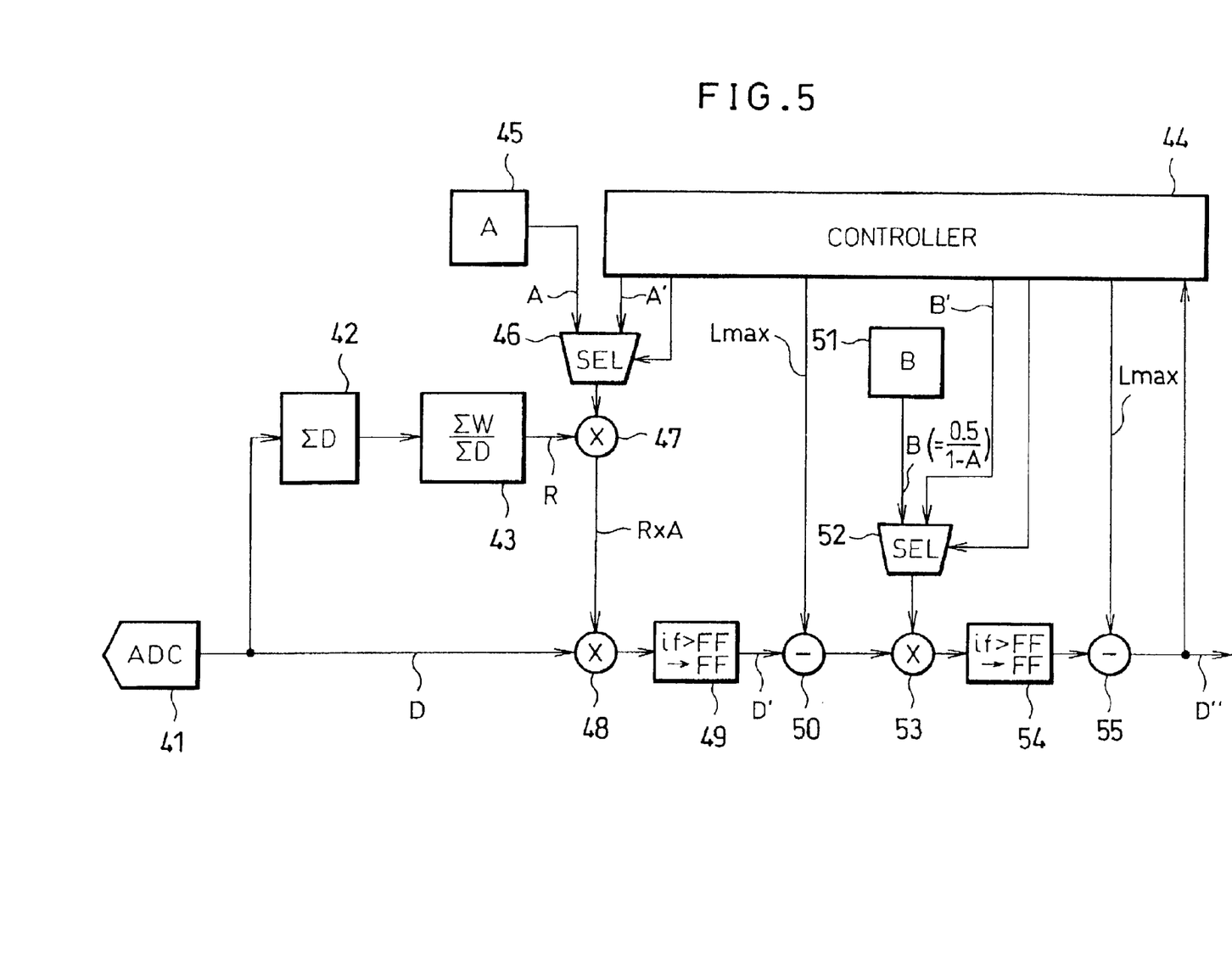
FIG. 5 is a block diagram representation of a third embodiment of an image processor according to the invention.

FIGS. 5 and 6 illustrate a third embodiment of an image processor of the invention, showing in block diagram the structural arrangement of the embodiment (FIG. 5) and relevant conversion operations thereof (FIG. 6).

It would be recalled that in the first and the second embodiments described above, a frame of input pixel data D are stored in a frame memory for example to determine the upper and the lower voltage limits Dmax and Dmin, respectively, of a set of significant pixel data, i.e. assessment area.

Third embodiment of the invention, unlike the first and the second embodiments, uses an average voltage of a significant band of image data in the pixel data processing, instead of directly determining the upper voltage limit Dmax and the lower voltage limit Dmin.

An ADC 41 shown in FIG. 5 converts the pixel data received from a LOG image sensor (not shown) to digital signals having a predetermined number of bits (8 bits for example) before the signals are output from the ADC 41. Integration means 42 integrates or sums up the input pixel data D belonging to an assessment area (an entire picture frame for example) based on a criteria that the new pixel data replace the old pixel data. Division means such as a divider 43 determines the ratio R=ΣW/ΣD, where ΣW is the sum of the pixel data belonging to the assessment area summed on the assumption that these pixels have maximum possible values (i.e. white), and the sum ΣD obtained by the integration means 42.

A controller 44 controls various operations in the image processor of the embodiment. A first coefficient setting means 45 provides a first coefficient A to multiply the ratio R obtained by the divider 43 by the coefficient. A second coefficient setting means 51 provides a second coefficient B. Other components of the controller 44 will be described below. A timing clock (not shown) is also provided to provide different timing signals to other components such as the ADC 41 and the controller 44.

Operation of the fourth embodiment will now be described with additional reference to FIGS. 5 and 6. In this embodiment, a frame of pixel data D is supplied from the ADC 41 to one input end of a multiplier 48. The pixel data D are also supplied to the integration means 42, where the data D are summed up as the pixel data associated with the assessment area. That is, the sum ΣD represents the sum of all the pixel data of the current frame.

Next, the divider 43 obtains the ratio of the sum ΣW of the maximum possible values of the pixel data belonging to the frame (which equals the sum of all the pixels when the pixels were all white) to the sum ΣD. The first coefficient A set in a first coefficient setting means 45 is provided via switching means 46 to a multiplier 47, where the ratio R is multiplied by the first coefficient A.

The product R×A calculated by the multiplier 47 and the pixel data D supplied from the ADC 41 are multiplied together in a multiplier 48. If the result of the multiplication in the multiplier 48 exceeds a prescribed post-conversion maximum Lmax, it is replaced by the post-conversion maximum Lmax in a replacement means 49 to obtain a first converted pixel data D'.

Figure 6A:
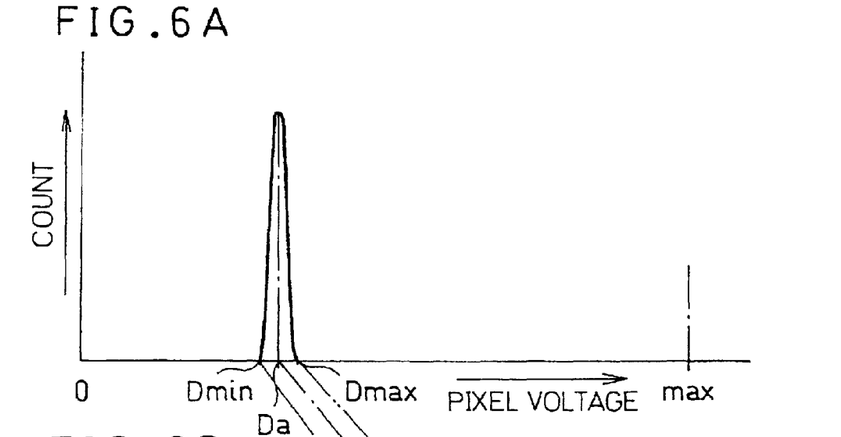
FIG. 6 is a figurative representation of conversions used in the third embodiment of the invention.

It is seen in FIG. 6(a) that the pixel data D supplied by the ADC 41 are concentrated in a narrow voltage band, Dmin–Dmax. The average Da of the pixel data D is obtained from the sum ΣD summed up in the integration means 42 for the assessment area, which is the entire frame of the pixel data D in the embodiment shown herein. If the pixel data D has a normal distribution, the average Da corresponds to the medium of the voltage band in the range Dmin–Dmax.

The ratio R obtained by the divider 43 represents a ratio of the average Da of the pixel data D to the post-conversion maximum Lmax. Hence, if the pixel data D are directly multiplied by the ratio R of the divider 43, pixel data D having values greater than the average Da will exceed the post-conversion maximum Lmax. It is thus necessary to adjust the value of the ratio R of the divider 43.

The first coefficient A set in the first coefficient setting means 41 is provided to adjust the magnitude of R, so that the coefficient A is set to a value which is a little smaller than 1 (in the range of 0.7–0.9 for example). The magnitude of A is chosen based on the average Da and an estimated band width about the average Da of the pixel data D.

Figure 6B:
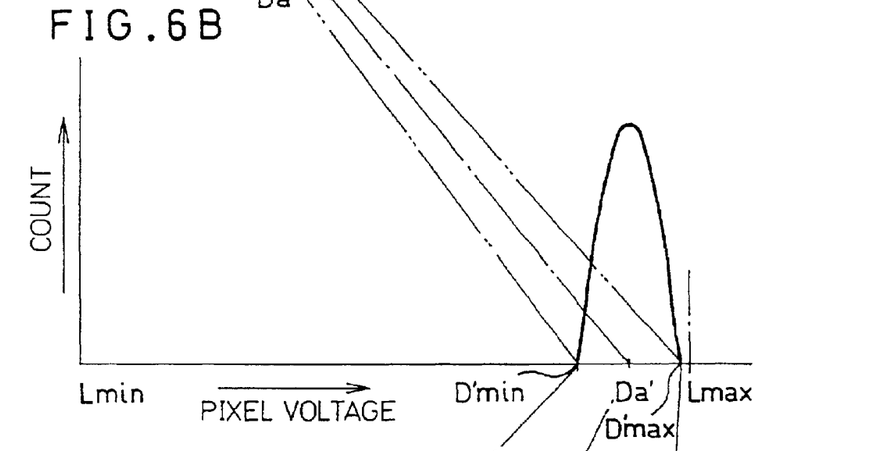

Thus, by multiplying the pixel data D supplied from the ADC 41 by the product R×A, the upper voltage limit Dmax of the pixel data D will be converted to a value close to the post-conversion maximum Lmax, as shown in FIG. 6(b). The resultant pixel data constitute first converted pixel data D'.

A second conversion will now be described. Each of the first converted pixel data D' is first subtracted from the post-conversion maximum Lmax in subtractor 50. Then the difference obtained in the subtractor 50 and the second coefficient B set in the second coefficient setting means 51 are transferred therefrom via switching means 52 and multiplied together in a multiplier 53. The product obtained in the multiplier 53 exceeding the post-conversion maximum Lmax is replaced by Lmax in a replacement means 54. The second converted pixel data D" are obtained by subtracting the replaced value from the post-conversion maximum Lmax in a subtractor 55. It is noted that the subtractions performed in the subtractors 50 and 55 can be made simply by inverting all the data bits if Lmax is the maximum possible value for the pixel data.

The subtraction of the first converted pixel data D' from the post-conversion maximum Lmax in the subtractor 50 amounts to an axi-symmetric inversion of the first converted pixel data D' (D'min–D'max) about the midpoint of Lmax and Lmin (which is 0 in the example shown herein), as shown in FIG. 6(b).

The next multiplication of the second coefficient B in the multiplier 53 amounts to an expansion of the axi-symmetrically inverted pixel data by the second coefficient B. The magnitude of the second coefficient B is such that Lmax–D'min is converted to Lmax–Lmin, as seen in FIG. 6(b). Hence, the second coefficient B is set to a value estimated from the distribution of the pixel data D to perform such conversion.

The second coefficient B may be set to k/(1−A) in association with the first coefficient A, where k is an arbitrary constant, for example 0.5. In this case, the second coefficient B may be automatically changed arbitrarily by changing the magnitude of the first coefficient A.

Figure 6C:
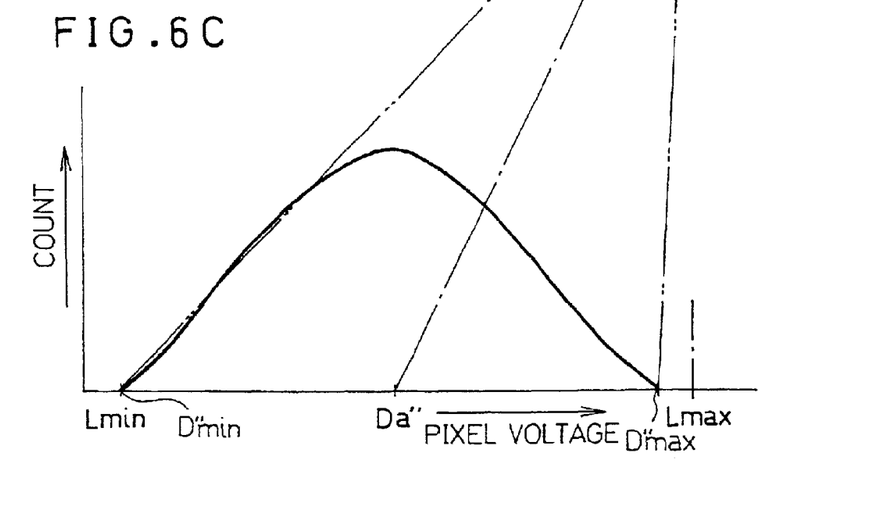

The subtraction from the post-conversion maximum Lmax in the subtractor 55 amounts to another axi-symmetric conversion of the pixel data expanded by the second coefficient B about the midpoint of the post-conversion maximum Lmax and the minimum Lmin (which minimum is 0 in the example shown herein). As a result of this conversion, second converted, expanded pixel data D" as shown in FIG. 6(c).

In the example shown herein above, first converted pixel data D' that exceed the post-conversion maximum Lmax are replaced by Lmax by the replacement means 49. If the first coefficient A is too large, there will be too many pixel data D' that exceed Lmax and must be replaced by Lmax. If, on the other hand, the coefficient A is too small, then there will be too few exceeding Lmax, implying that the image processor is not functioning properly in the fully usable range up to the post-conversion maximum Lmax.

Therefore, in order to have the first coefficient set to an optimum magnitude, a feedback loop is provided to alter the first coefficient A to a modified first coefficient A' which is smaller than A by a predetermined magnitude if the number of the pixels in the second converted pixel data D" to be replaced by Lmax exceeds a predetermined number N1, but the first coefficient A is altered to a modified first coefficient A" which is greater than A by a predetermined magnitude if the number of the pixels in the second converted pixel data D" to be replaced by Lmax is less than a predetermined number N2.

The alteration of the coefficient A may be carried out by switching means 46 which is adapted to select either the first coefficient A or the modified first coefficient A' in response to an instruction received from the controller 44, as shown in FIG. 5, and provide the selected coefficient to the multiplier 47.

Thus, significant pixel data D are converted in the first conversion such that the upper limit of the first converted pixel data automatically matches with the post-conversion maximum.

This feature of the automatic adjustment of the upper limit is the same also in the second conversion. That is, the pixel data multiplied by the second coefficient B in the multiplier 53 are replaced by the post-conversion maximum Lmax in the replacement means 54 if the multiplied values exceed Lmax. If there are too many pixel data D" less than the post-conversion minimum Lmin requiring the replacement thereof by Lmin, then the second coefficient B is larger than an optimum magnitude. If, on the other hand, there are too few requiring the replacement, the second coefficient B is smaller than an optimum magnitude.

Therefore, in order to have the number of pixel data replaced by the post-conversion minimum Lmin within an allowable range, a feedback loop is provided to alter the second coefficient B to a modified second coefficient B' which is smaller than B by a predetermined magnitude if the number of the pixels data in the second converted pixel data D" replaced by Lmin (which is 0 in the example shown herein) exceeds a predetermined number N3, but the second coefficient B is altered to a modified second coefficient B" which is greater than B by a predetermined magnitude if the number of the pixel data replaced is less than a predetermined number N4.

The alteration of the second coefficient B may be carried out by switching means 52 which is adapted to select either the second coefficient B or the modified second coefficient B' in response to an instruction received from the controller 44, as shown in FIG. 5, and provide the selected coefficient to the multiplier 53.

Thus, the significant pixel data D may be converted in the second conversion such that the lower limit of the second converted pixel data automatically matches with the post-conversion minimum.

Thus, in the embodiment shown herein, the first coefficient A for the first conversion and the second coefficient B for the second conversion are adjusted automatically as described above by the feedback loops. As a result, when the image data represent a still picture, the feedback operations will render the upper and the lower limits to converge to their optimum magnitudes, and hence the pixel data to an optimum image data.

If, on the other hand, the pixel data represent an animated picture, the feedbacks are effected on the next frame. Thus, if there is not a significant change between two succeeding frames, the adjustments of the coefficients by the feedback loops will take effect on the virtually the same next frame that follows. However, if the pictures change quickly the adjustment will take effect a little behind the scene.

In the fourth embodiment of the invention, the entire data D are subjected to a first and a second conversions, wherein the data D are converted to a first converted pixel data D' in the first conversion by multiplication of a first coefficient A and a ratio R, where R is the ratio of the sum $\Sigma W$ of all the pixel data in the assessment area summed on the assumption that all of the pixel data have maximum possible values, to the sum $\Sigma D$ of all the actual pixel data in the assessment area, and wherein the converted pixel data D' are further converted to D" in the second conversion by multiplicative and subtractive operations using a second coefficient B and a prescribed post-conversion maximum Lmax. This implies that no frame memory for example for storing the pixel data D is needed, and that the image processing can be carried out through sequential conversions of the data by simple multiplication and subtraction.

In the fourth embodiment as described above, it is tacitly assumed that the post-conversion minimum Lmin for the first converted pixel data is zero. In fact, the post-conversion minimum Lmin is mostly chosen to be zero for convenience. In actuality, however, Lmin need not be zero. It can be set to an arbitrary positive or negative value as well.

An image conversion in cases where the post-conversion minimum Lmin is not zero will be accomplished as follows.

In the fourth embodiment shown in FIGS. 5 and 6, when the post-conversion minimum Lmin is set to an arbitrary value other than zero, the post-conversion maximum Lmax is replaced by a modified post-conversion maximum Lmax', which is Lmax shifted by Lmin, or Lmax minus Lmin. The modified post-conversion maximum Lmax' is used also in the replacement means 49 and 54 in the same manner.

When the shifted post-conversion maximum Lmax' is used instead of Lmax, the pixel data D may be shifted by Lmin prior to the conversion. Thus, as the post-conversion maximum Lmax is shifted by the post-conversion minimum Lmin, the pixel data D are shifted by the same magnitude Lmin. Consequently, the order of magnitude of the pixel data D and the post-conversion maximum Lmax' remains unchanged even after the shifting. In this manner, if the Lmin is not zero, processing of the image data can be properly performed by shifting both the post-conversion maximum and the pixel data D by the same magnitude Lmin.

The pixel data are further converted, as in the fourth embodiment shown in FIGS. 5 and 6 using the shifted post-conversion maximum Lmax', to obtain a second converted pixel data D". Finally, the post-conversion minimum Lmin is added to the image data D" to generate the image data to be displayed.

It would be understood that the image processor modified also provides the same result as the fourth embodiment shown in FIGS. 5 and 6, and in addition, a freedom of choice of positive and negative post-conversion minima. It would be appreciated that the image processing described above may be realized by a simple image processor, since the first and the second conversions can be performed in the same manner as in the preceding embodiments using a shifted post-conversion maximum Lmax', and by simply adding the post-conversion minimum Lmin to the second converted image data.

It would be understood that the procedure for processing non-zero post-conversion minimum Lmin as described above in connection with the fourth embodiment can be equally applied to other cases as described below.

Figure 7:
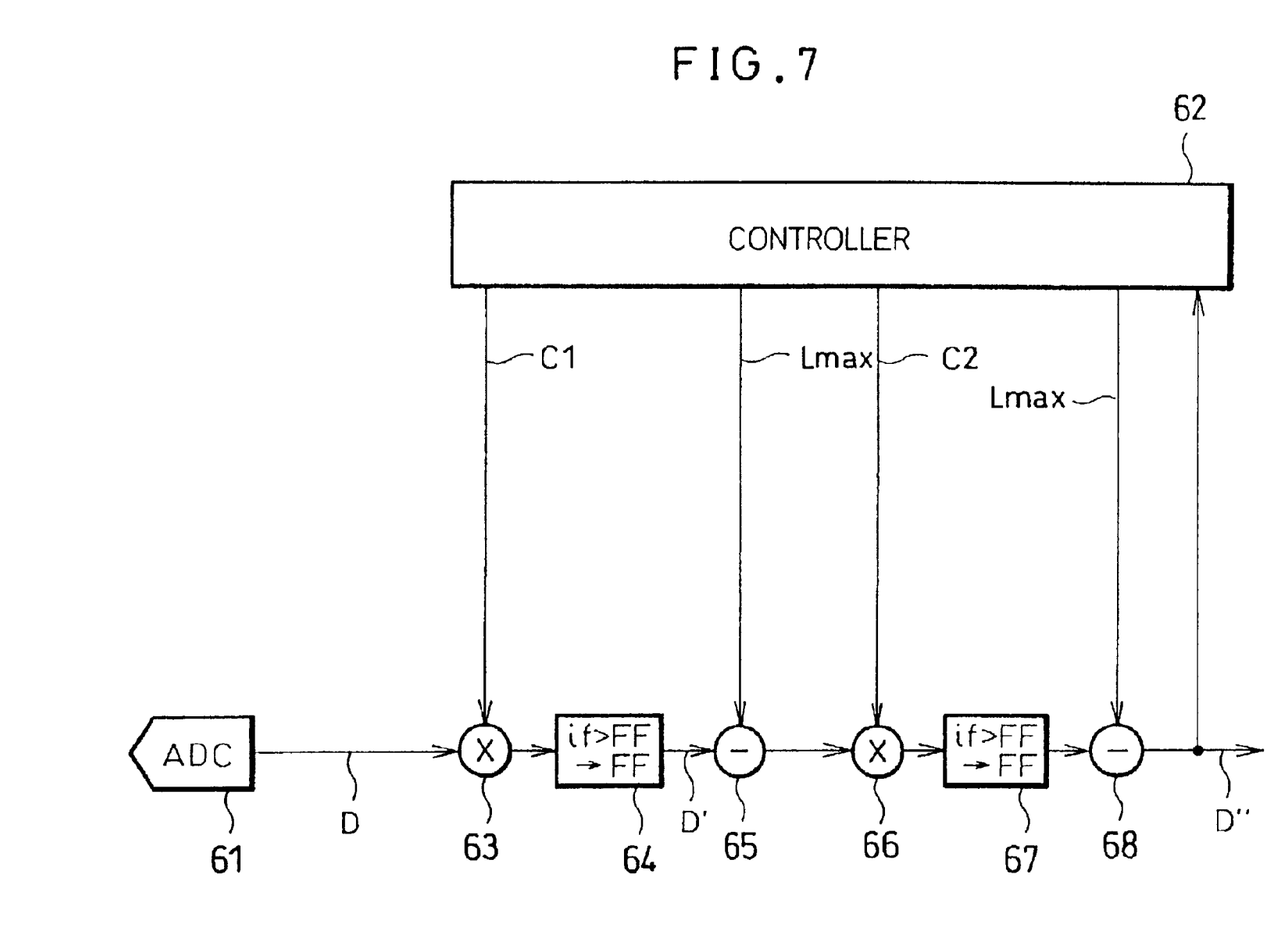
FIG. 7 is a block diagram representation of a fourth embodiment of an image processor according to the invention.

FIG. 7 illustrates, in block diagram, a preferred arrangement of the fourth embodiment of image processor according to the invention.

As shown in FIG. 7, the image processor differs from the third image processor shown in FIG. 5 in that a controller 62 provides a predetermined third coefficient C1 to multiplier 63 (which corresponds to the multiplier 48 in FIG. 5) for the use in the first conversion, and a fourth predetermined coefficient C2 to multiplier 66 (which corresponds to the multiplier 53 in FIG. 5) for the second conversion. These coefficients have their own initial values. Procedures for the first and the second conversions are basically the same as described in connection with the fourth embodiment shown in FIG. 6.

As shown in FIG. 7, the multiplier 63 multiplies all the pixel data D lying in a voltage band Dmin–Dmax received from an ADC 61, by the third coefficient C1 provided by the controller 62. By the multiplication of the third coefficient C1, if it is set appropriately for the pixel data D, the maximum of the first converted pixel data D will be close to a prescribed post-conversion maximum Lmax. A first converted pixel data D' is obtained by replacing by the post-conversion maximum Lmax the converted pixel data that exceed Lmax, using a replacement means 64.

Each of the first converted pixel data D' is subtracted from the post-conversion maximum Lmax in a subtractor 65, and then multiplied by the fourth coefficient C2 in a multiplier 66. If the resultant data exceeds Lmax, it is replaced by Lmax by a data replacement means 67. The resultant data is again subtracted from the post-conversion maximum Lmax in subtractor 68. A set of all pixel data obtained from D' in this manner constitute second conversion pixel data D".

If, in the first conversion, the number of pixel data replaced by Lmax in the replacement means 64 exceeds a predetermined number N1, the third coefficient C1 is decreased by a predetermined magnitude, and if the number of the replaced pixel data is less than a predetermined number N2, the third coefficient C1 is incremented by a predetermined magnitude.

A feedback loop is provided such that the fourth coefficient C2 is decreased by a predetermined magnitude if the number of pixel data replaced by Lmax in the replacement means 67 exceeds a predetermined number N3, but the fourth coefficient C2 is incremented by a predetermined magnitude if the number of pixel data replaced by Lmax is less than a predetermined number N4.

Accordingly, the upper limit of the voltage band of the significant pixel data D is automatically adjusted to match with the post-conversion maximum in the first conversion, and the lower limit of the voltage band of the significant pixel data D is automatically adjusted to match with the post-conversion minimum in the second conversion.

In this fourth embodiment of the invention, such operational components as a frame memory for temporarily storing the entire pixel data in determining the voltage band Dmin–Dmax, and integration means for summing up the pixel data are not needed, since the voltage band of the significant pixel data D, especially the upper voltage limit Dmax, is determined by the third coefficient C1.

Accordingly, the circuitries for the image processing can be greatly simplified.

It would be appreciated that the image processing of the invention can be carried out by a sequence of simple multiplicative and subtractive operations on the pixel data D in such a way that a first converted pixel data D' are obtained in the first conversion by multiplication of a third coefficient C1 having a predetermined initial value, and second pixel data D" in the second conversion using a post-conversion maximum Lmax and a predetermined fourth coefficient C2.

It could be also appreciated that the upper voltage limit Dmax and the lower voltage limit Dmin of the converted pixel data are automatically adjusted by incrementing or decreasing the third coefficient C1 in the first conversion, depending on whether the number of the pixel data which exceed Lmax and replaced by Lmax is larger than predetermined numbers, and by incrementing or decreasing the fourth coefficient C2, depending on whether the number of replaced pixel data exceeding the post-conversion maximum Lmax is larger than predetermined numbers.

Figure 8:
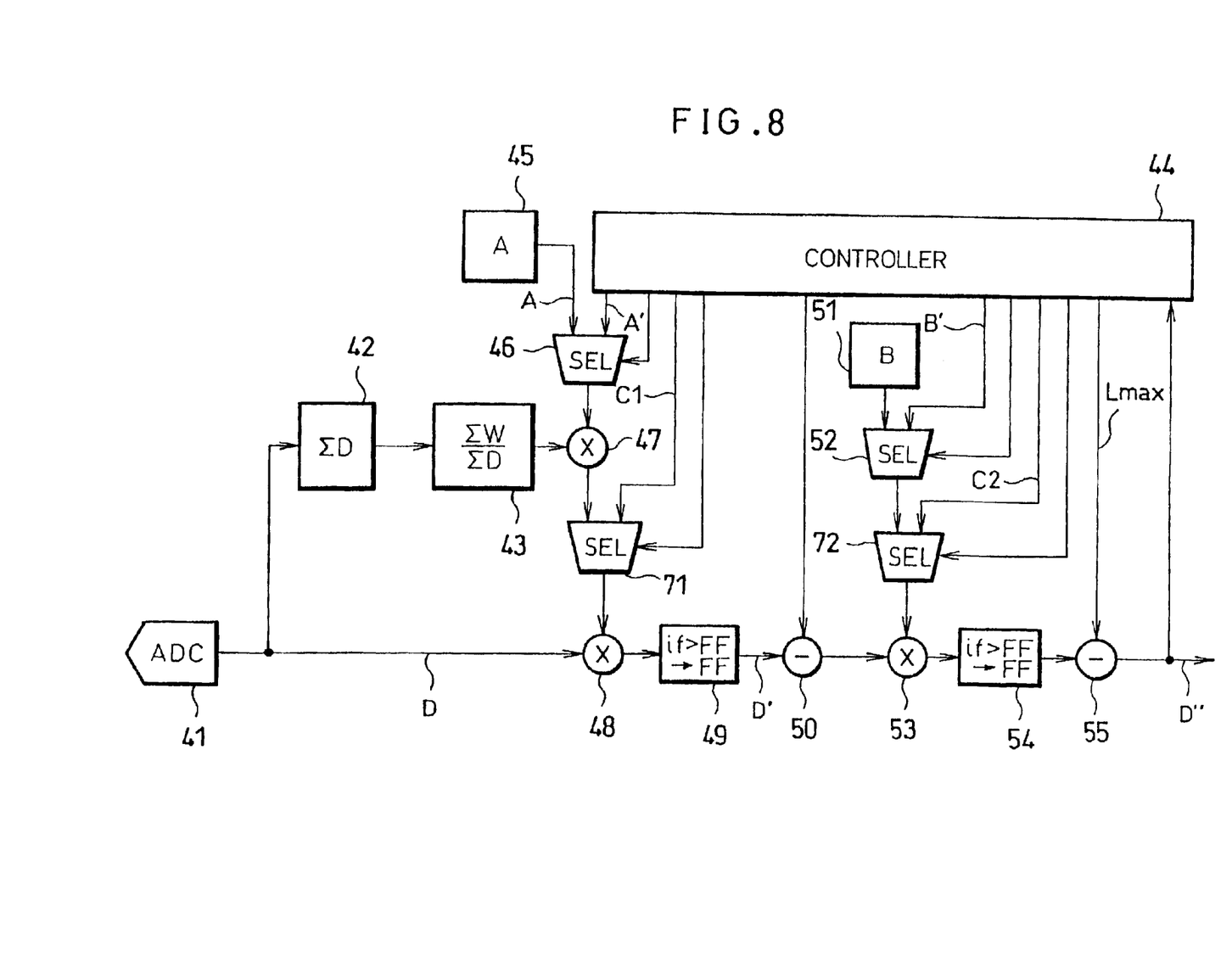
FIG. 8 is a block diagram representation of a fifth embodiment of an image processor according to the invention.

FIG. 8 is a block diagram showing a fifth embodiment of an image processor of the invention. The embodiment of FIG. 8 is designed to select either the third embodiment shown in FIG. 5 or the fourth embodiment shown in FIG. 7

Particularly, the embodiment has switching means 71 between the two multipliers 47 and 48 for providing the third coefficient C1 by the controller 44, and another switching means 72 between the switching means 52 and the multiplier 53 for providing the fourth coefficient C2 by the controller 44.

In this embodiment, therefore, the image processor of the invention may selectively execute either the third embodiment (FIG. 5) or the fourth embodiment (FIG. 7) as needed.

It should be noted that each of the embodiments of the invention as described and shown in the respective block diagrams may be realized in the form of a software installed on a computer.

What we claim is:

1. An image processor comprising:
voltage band determination means for determining a voltage band for an image to be displayed which are generated by an image sensor outputting a compressed image (compressive image sensor) in response to the light received by said compressive image sensor; and
image conversion means for converting said voltage band by expanding said band,
wherein said image conversion means further comprises:
subtraction means for subtracting the lower limit of said voltage band from said voltage band so as to match the lower limit of said subtracted band with a prescribed post-conversion minimum Lmin; and
multiplication means for converting said subtracted band so as to match the upper limit of the converted band with a prescribed post-conversion maximum Lmax.

2. An image processor comprising:
voltage band determination means for determining a voltage band for an image to be displayed which are generated by an image sensor outputting a compressed image (compressive image sensor) in response to the light received by said compressive image sensor; and
image conversion means for converting said voltage band by expanding said band,
wherein said image conversion means further comprises:
multiplication means for matching the upper limit of said voltage width with a given post-conversion maximum Lmax; and operational means for matching the lower limit of the multiplied voltage width with a given post-conversion minimum Lmin.

3. An image processor comprising:

first conversion means for obtaining first conversion data D' for the entire pixel data D lying within a significant voltage band Dmin–Dmax by (i) constructing a ratio R of the sum of the assessment pixel data belonging to an assessment area that precedes currently processing pixel data D to the sum of said assessment pixel data summed on the assumption that all of said assessment pixel data have maximum possible values, (ii) multiplying each of the pixel data D by said ratio R and a first predetermined coefficient A, and (iii) replacing by a prescribed post-conversion maximum Lmax those pixel data that exceed said maximum Lmax upon multiplication of said ratio R and said coefficient A; and second conversion means for obtaining second conversion data D" by (iv) subtracting each of said pixel data D' from post-conversion maximum Lmax, (v) multiplying each of the subtracted data of (i) by a second predetermined coefficient B, (vi) replacing by said post-conversion maximum Lmax those pixel data that exceed said post-conversion maximum Lmax upon multiplication of said coefficient B, and (vii) subtracting again from said post-conversion maximum Lmax each of the data that result from the foregoing steps (iv)–(vi).

4. The image processor according to claim 3, wherein said first conversion means has a feedback loop to decrease said first coefficient A by a predetermined magnitude when the number of the pixel data replaced by said post-conversion maximum Lmax is greater than a predetermined number N1, but increment said coefficient A by a predetermined magnitude when said replaced number of pixel data is less than a predetermined number N2.

5. The image processor according to claim 3, wherein said second conversion means has a feedback loop to decrease said second coefficient B by a predetermined magnitude when the number of pixel data replaced by said post-conversion maximum Lmax is greater than a predetermined number N3, but increment said coefficient B by a predetermined magnitude when said replaced number of pixel data is less than a predetermined number N4.

6. The image processor according to claim 3, wherein said second Lmax is replaced by Lmax'=Lmax–Lmin in said first and said second conversion means when said minimum Lmin is a positive/negative number (other than zero); and said second conversion means is adapted to output the sum of said second converted pixel data D" and Lmin.

7. The image processor according to claim 6, adapted to subtract said post-conversion minimum Lmin from all of the pixel data D prior to said first conversion.

8. An image processor, comprising:

first conversion means for converting all the pixel data D lying in a voltage band in a range Dmin–Dmax to obtain first converted pixel data D' by (i) multiplying said pixel data D by a third coefficient C1 having a predetermined initial value, (ii) replacing those converted pixel data that exceed a prescribed post-conversion maximum Lmax by Lmax; and second conversion means for obtaining second conversion data D" by (iii) subtracting each of said first converted pixel data D' from said post-conversion maximum Lmax, (iv) multiplying the result of said subtraction in (iii) by a fourth multiplication coefficient C2, (v) replacing by said post-conversion maximum Lmax those pixel data that exceed Lmax upon multiplication of C2 in (iv), and (vi) again subtracting from Lmax each of the resultant pixel data obtained in steps (iii)–(v).

9. The image processor according to claim 8, wherein said first conversion means has a feedback loop to decrease said third coefficient C1 by a predetermined magnitude when the number of pixel data replaced by said post-conversion maximum Lmax is greater than a predetermined number N1, but increment said coefficient C2 by a predetermined magnitude when said replaced number of pixel data is less than a predetermined number N2.

10. The image processor according to claim 8, wherein said second conversion means has a feedback loop to decrease said fourth coefficient C2 by a predetermined magnitude when the number of pixel data replaced by said post-conversion maximum Lmax is greater than a predetermined number N3, but increment said coefficient C2 by a predetermined magnitude when said replaced number of pixel data is less than a predetermined number N4.

11. The image processor according to claim 8, wherein said first and said second conversion means are adapted to replace said post-conversion maximum Lmax by a modified post-conversion maximum defined by Lmax'=Lmax–Lmin when said post-conversion minimum Lmin is not zero, and wherein said second conversion means is further adapted to add said post-conversion minimum Lmin to said second converted pixel data D".

12. The image processor according to claim 11, adapted to subtract said post-conversion minimum Lmin from all of the pixel data D prior to said first conversion.

* * * * *